United States Patent

[11] 3,628,064

[72] Inventors Hans R. Camenzind
Los Altos;
Alan B. Grebene, Sunnyvale, both of Calif.

[21] Appl. No. 806,855

[22] Filed Mar. 13, 1969

[45] Patented Dec. 14, 1971

[73] Assignee Signetics Corporation
Sunnyvale, Calif.

[54] VOLTAGE TO FREQUENCY CONVERTER WITH CONSTANT CURRENT SOURCES

3 Claims, 6 Drawing Figs.

[52] U.S. Cl. .......... 307/261, 307/229, 307/264, 307/271

[51] Int. Cl. .......... H03k 5/00, H03k 1/10

[50] Field of Search .......... 307/229, 235, 261, 264, 271, 279, 303; 321/4, 6, 8; 317/235 (29)

[56] References Cited

UNITED STATES PATENTS

| | | | |
|---|---|---|---|
| 3,274,501 | 9/1966 | Heinsen | 307/229 X |
| 3,309,537 | 3/1967 | Archer | 307/303 |
| 3,319,174 | 5/1967 | Hellstrom | 307/303 X |
| 3,350,574 | 10/1967 | James | 307/261 |
| 3,355,669 | 11/1967 | Avins | 307/303 X |
| 3,383,521 | 5/1968 | Greenberg | 307/303 X |
| 3,389,271 | 6/1968 | Gray | 307/271 X |
| 3,395,265 | 7/1968 | Weir | 307/303 X |
| 3,482,116 | 12/1969 | James | 307/261 |
| 3,504,267 | 3/1970 | James et al. | 307/271 X |
| 3,383,614 | 5/1968 | Emmons et al. | 317/235 UX |
| 3,440,448 | 4/1969 | Dudley | 307/271 |

OTHER REFERENCES

Pub. I, " Novel Voltage-Variable Schmitt Circuit," in The General Radio Experimenter dated Nov.- Dec., 1968, pages 13 to 16

*Primary Examiner*—Stanley D. Miller, Jr.
*Attorney*—Flehr, Hohbach, Test, Albritton & Herbert

ABSTRACT: A voltage controlled multivibrator which is in integrated form includes an integrating capacitor which is charged by one current source of the value I and discharged by a second current source of a value 2I. The first current source is on continuously and the second current source is turned on and off by the switching of a Schmitt trigger which is responsive to the voltage across the capacitor reaching a maximum voltage at which time the current source is turned on and a discharging of the capacitor to a minimum voltage at which time the current source is turned off. The integrated format of all of the transistors along with a high-impedance input of the Schmitt trigger provides an extremely small or zero temperature coefficient.

TRIGGER OUTPUT
AND
$I_4$

INVENTORS
Hans R. Camenzind
Alan B. Grebene
BY Flehr, Hohbach, Test, Albritton & Herbert
Attorneys INVENTOR.
Hans R. Camenzind
Alan B. Grebene
BY Flehr, Hohbach, Test, Albritton & Herbert
Attorneys INVENTORS
Hans R. Camenzind
Alan B. Grebene
BY Flehr, Hohbach, Test, Albritton & Herbert
Attorneys

VOLTAGE TO FREQUENCY CONVERTER WITH CONSTANT CURRENT SOURCES

BACKGROUND OF THE INVENTION

The present invention is directed to a voltage to frequency converter and more specifically to a voltage controlled multivibrator having a sawtooth waveform output.

Prior art voltage controlled multivibrators normally have an output periodic waveform which has many higher harmonics. While a sine wave output would be ideal, this is impractical to produce. In addition it is desirable that such multivibrators have a relatively wide frequency bandwidth and be linear in operation. In other words, there should be a linear relationship between the input control voltage variation and the change of output frequency.

Another desirable feature of the voltage controlled multivibrator is that it be temperature stable. With the use of solid state components this has been difficult to achieve in the past both for discrete and integrated type circuits.

Lastly, where it is desired to completely integrate the voltage controlled multivibrator, the circuit should be as simple and straightforward as possible for easy integration.

OBJECT AND SUMMARY OF INVENTION

It is therefore a general object of the present invention to provide an improved voltage to frequency converter.

It is another object of the invention to provide a converter as above which provides a periodic output having few harmonics.

It is another object of the invention to provide a converter as above which is linear in operation.

It is another object of the invention to provide a converter as above which is temperature stable.

It is another object of the invention to provide a converter as above which lends itself to easy integration.

In accordance with the above objects there is provided an integrated circuit for a voltage to frequency converter for converting an analog input signal into a periodic signal having a frequency related to the magnitude of the input signal. The converter comprises a semiconductive substrate and electrical charge integrating means with switching means coupled to the integrating means for sensing predetermined maximum and minimum magnitudes of integrated charge. The switching means includes a plurality of transistors integrated into said substrate. The switching means switch from one condition to another in response to the maximum and minimum magnitudes. Coupled to the integrating means is electrical charge source means responsive to the magnitude of the input signal to supply charge to the integrating means in one sense at a rate proportional to such magnitude. The charge source means is also responsive to the conditions of the switching means to supply charge to the integrating means in an opposite sense at a rate proportional to such magnitude. The charge source means includes a plurality of transistor integrated into the substrate and having substantially identical characteristics.

DETAILED DESCRIPTION OF INVENTION

Figure 1:
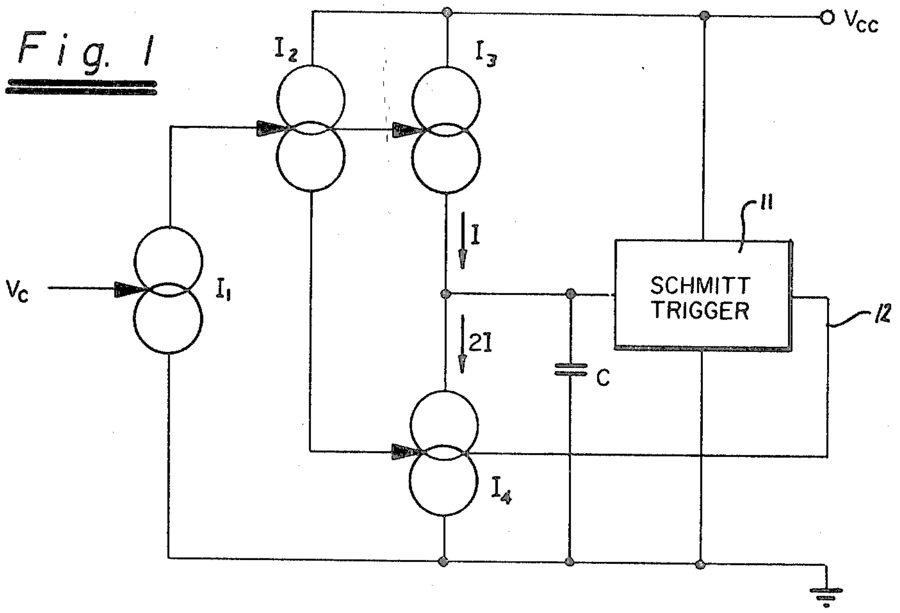
FIG. 1 is a block diagram of a voltage to frequency converter embodying the present invention.

Referring first to FIG. 1, an analog input signal $V_c$ is coupled into a current source $I_1$. The magnitude of the current source is proportional to the magnitude of the analog input signal. Source $I_1$ is coupled to a current source $I_2$ which provides a current identical to $I_1$ to both a current source $I_3$ and $I_4$.

In turn current source $I_3$ produces a current of the same magnitude as $I_1$ indicated as I, flowing toward or charging a capacitor, C, and current source $I_4$ produces double that amount of current but in an opposite polarity designated with the arrow as 2I flowing away from the same junction with capacitor C. Capacitor C serves, of course, as electrical charge integrating means for the current sources $I_3$ and $I_4$. The magnitude of the charge on line 10 stored by capacitor C is sensed by a Schmitt trigger 11.

Figure 2A:
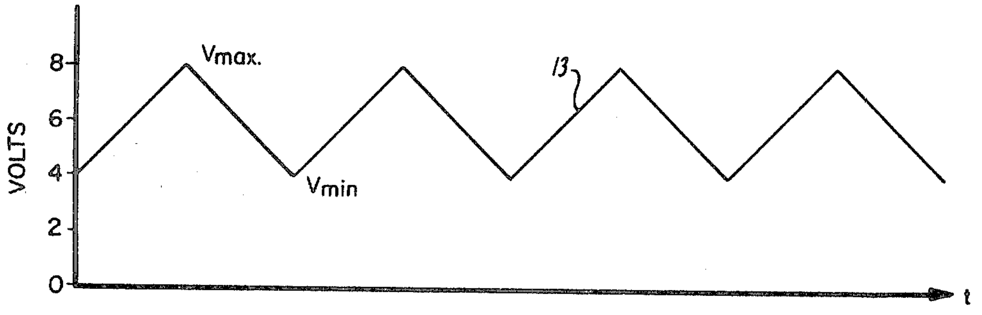
FIGS. 2A and 2B are waveforms useful in understanding the invention.
Figure 2B:
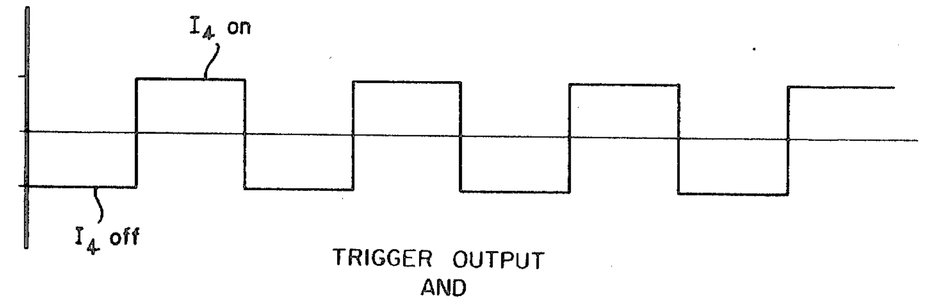

Schmitt trigger 11 has an output on line 12 which is shown in FIG. 2B. Switching of the Schmitt trigger takes place at predetermined maximum and minimum voltage levels on line 10. The resultant waveform 13 across capacitor C is shown in FIG. 2A where the maximum and minimum switching levels of Schmitt trigger 11 are indicated as $V_{max}$ and $V_{min}$.

The output of Schmitt trigger 11 on line 12 is coupled to current source $I_4$ and serves to gate the current source. As illustrated in FIG. 2B the current source $I_4$ is on or producing current during the change of the waveform 13 from $V_{max}$ to $V_{min}$. As is apparent from the waveform 13, this is the discharge period of the capacitor C since more current, namely 2I, is being drawn out of the capacitor than is being fed into it by current source $I_3$, namely, the current I.

OPERATION

The charge time of capacitor C is given by the equation:

$$t=CV/I \qquad (1)$$

Thus, the frequency of the waveform 13 will vary in accordance with a variation of $I$. C is, of course, constant, and $V$ represents the difference between the maximum voltage across the capacitor and the minimum which difference is maintained constant as will be explained in detail later by Schmitt trigger 11. The constant current $I$ is related to the analog input signal $V_c$ the following manner. The analog input voltage adjusts the value of $I_1$ so that it is proportional to $V_c$. $I_1$ then controls $I_2$ to cause the current output of $I_2$ to equal $I_1$. $I_2$ controls two current sources $I_3$ and $I_4$. As explained above, the current output $I_3$ is identical to $I_2$, but the current output of $I_4$ is twice that of the value of $I_2$.

When both of these currents, $I_3$ and $I_4$, are connected to capacitor C, as illustrated in FIG. 2B under the condition "$I_4$ on," capacitor C is discharged at a net rate of I. As the voltage across the capacitor drops to a lower limit, $V_{min}$, Schmitt trigger 11 switches or changes its condition and turns $I_4$ off as indicated again in FIG. 2B. Thus, the capacitor is charged with the current I and the voltage across it increases linearly. Moreover, the charging rate is the same as the discharge rate because of the fact that $I_4$ was double the value of $I_3$ and thus a symmetrical or triangular wave shape is produced. Triangular wave shape 13 inherently has very few higher harmonics as opposed to more normal multivibrator outputs.

Figure 3:
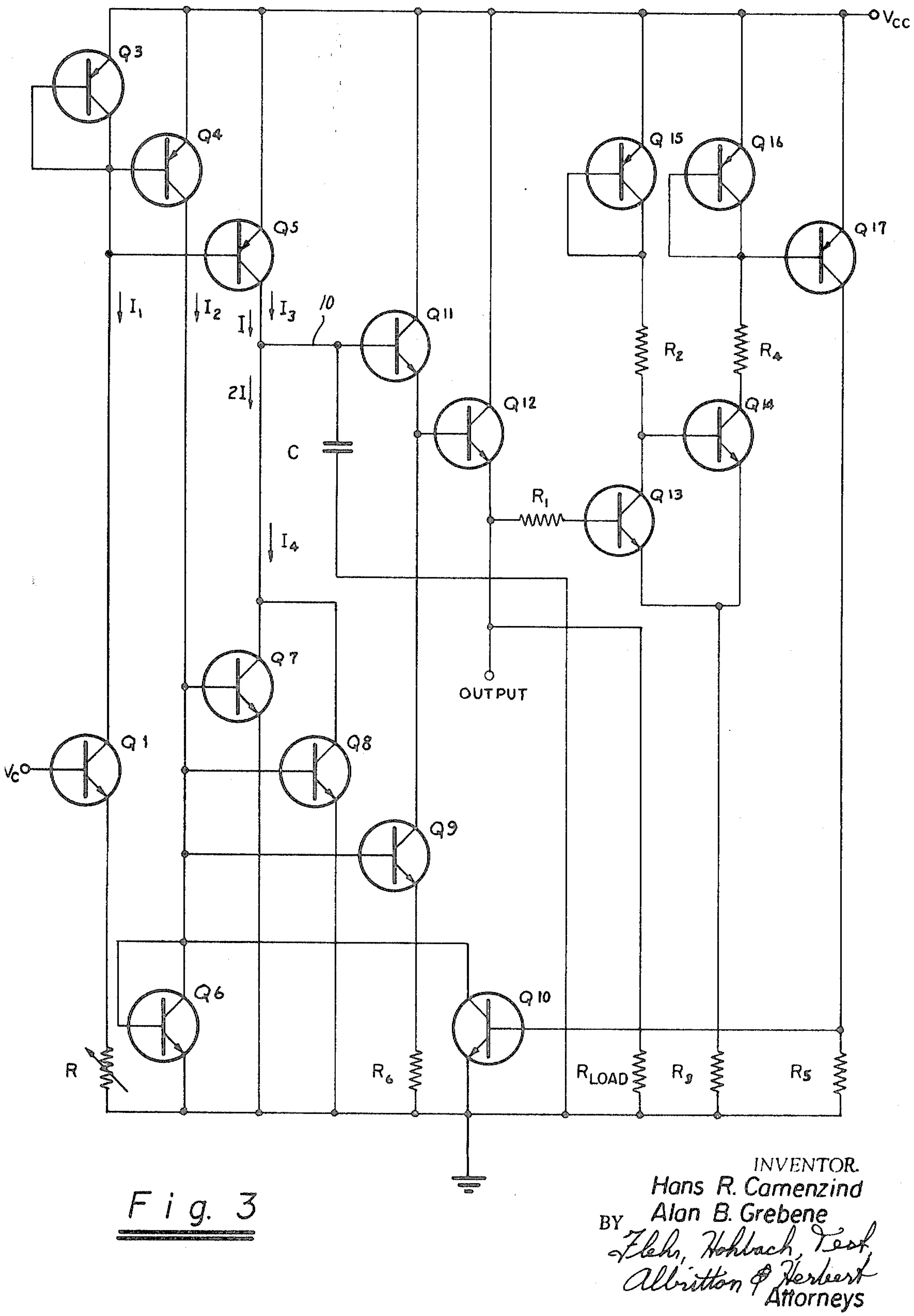
FIG. 3 is a detailed schematic circuit of FIG. 1.

An actual circuit of FIG. 1 is shown in FIG. 3 The transistors Q1 and Q3 through Q8 provide the current sources and the transistors Q3 to Q5 and Q6 to Q8 respectively are identical in their characteristics. This is easily achieved when the transistors are in integrated form.

The current source $I_1$ consists of transistor Q1 and resistor R. The emitter current $I_E$ of this transistor, which is actually $I_1$, is shown by:

$$I_E=V_c-V_{BE}/R \qquad (2)$$

where $V_{BE}$ is the base-emitter voltage of the transistor. Since the collector current is approximately equal to the emitter current (for a reasonably large current gain) and if $V_c$ is made much larger that $V_{BE}$ we get:

$$I_1=V_c/R \qquad (3)$$

Thus the analog input signal is converted to a current which is proportional to the magnitude of the input signal. The current source $I_2$ includes transistors Q3 and Q4. Current source $I_3$ includes transistor Q5. Q3 is connected as a diode with the base connected to the collector. The emitter base voltage of Q3 is then imposed across the emitter base junction of transistors Q4 and Q5. Since transistor 3 is identical to transistors Q4 and Q5, their collector currents, $I_2$ and $I_3$ will be equal to $I_1$. Hence, the operating currents of the current sources formed by these transistors is dependent only on the supply voltage $V_{cc}$ and the current $I_1$. In essence the transistors are connected as diode-biased transistors as discussed in an article by Widlar entitled "Some Circuit Design Techniques for Linear Integrated Circuits" in the IEEE Transactions on Circuit Theory, Vol. CT-12, No. 4, dated Dec. 1965.

Figure 4:
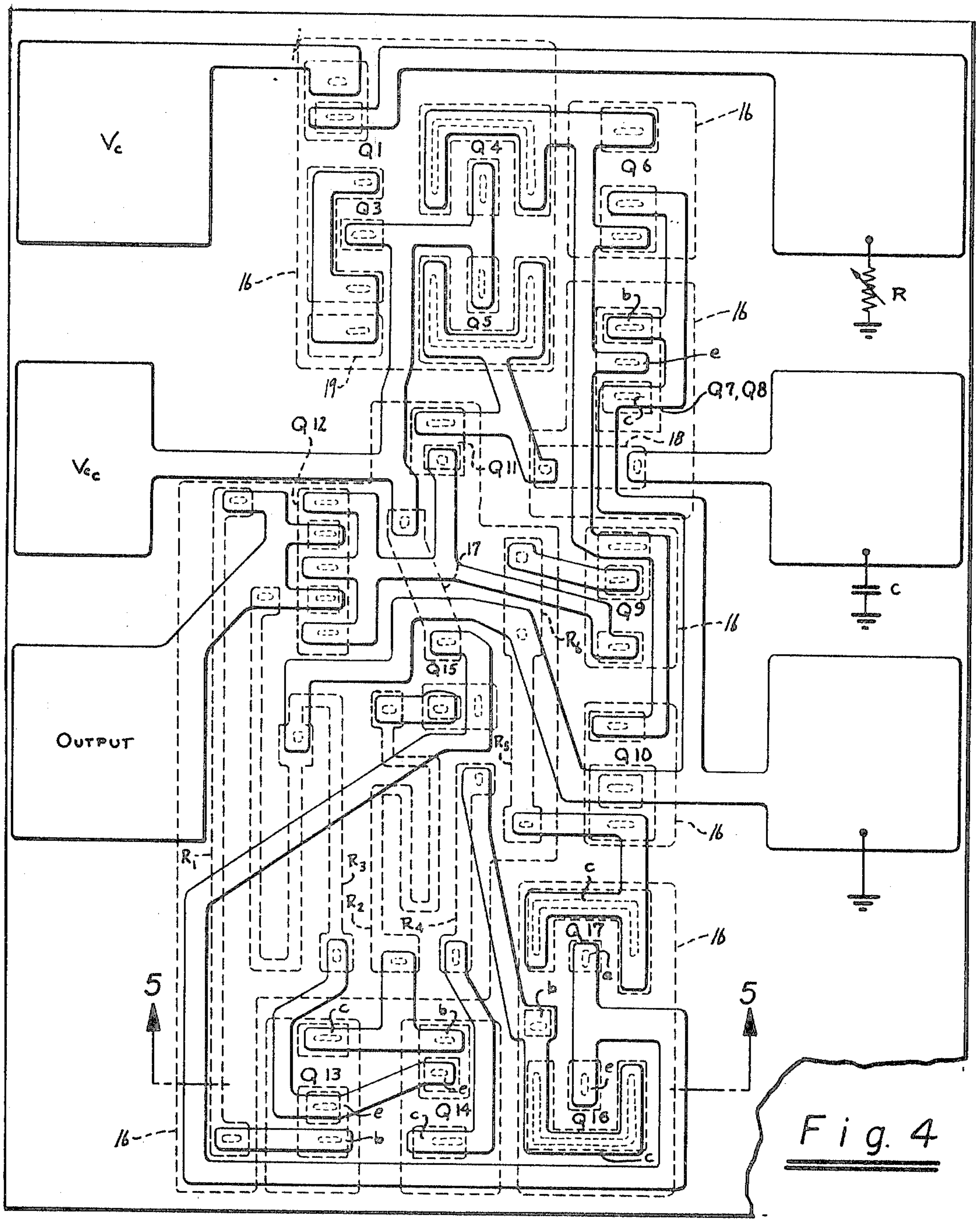
FIG. 4 is the circuit of FIG. 3 shown in integrated form.

The same configuration as above is utilized for transistors Q6, Q7 and Q8, where the current $I_2$ feeds these transistors. Q6 is connected as a diode to bias Q7 and Q8. Since the collectors of both these transistors are joined at a common junction at capacitor C, the current drawn by them, designated $I_4$, is twice the current produced by source $I_3$ or 2I. In integrated form transistors Q7 and Q8 would be combined into one transistor twice the size. This is illustrated in FIG. 4.

It is therefore apparent that an exact proportionality is achieved between the currents I and 2I and the input control signal, $V_c$, by the above construction. This includes the use of identical transistors and the diode-biasing configuration which uses a transistor to form the diode.

Schmitt trigger 11 includes transistors Q11, Q12, Q13 and Q14, and resistors $R_1$, $R_2$, $R_3$ and $R_4$. When $V_{max}$ is reached, transistor Q13 turns on and Q14 off. Transistors Q11, Q12 form a Darlington pair to provide a high-impedance input to the Schmitt trigger. This prevents current drain from capacitor C. Transistor Q9 and resistor $R_6$ coupled between the emitter of Q9 and ground is used to bias this high-impedance input. Waveform 13, or the voltage across capacitor C, is taken at the terminal labeled "output" at the emitter of Q12.

Current source $I_4$ is turned off by Schmitt trigger 11 through transistors Q16 and Q17 which serve as a diode-biased current source which activate transistor Q10 to bias Q6 on and off.

As capacitor C charges at a rate as determined by the control voltage, $V_c$, and/or setting of variable resistor R, the voltage across it moves toward $V_{max}$ as illustrated in FIG. 2A. As this upper limit is reached transistor Q13 turns on and Q14 turns off or becomes nonconductive. At this time the voltage at $R_3$ at its junction with the emitter of Q13 is given by:

$$V_1=I_{13}\times R_3 \qquad (4)$$

where $I_{13}$ is the collector-emitter current of transistor Q13 and $V_1$ the voltage at the emitter of Q13. The collector-emitter current of Q13 is given by the equation:

$$I_{13}=V_{cc}-V_{BE}/R_2+R_3 \qquad (5)$$

where $V_{BE}$ is the base emitter drop in this particular case of the transistor Q15. It should be noted, however, that all of the transistors of the trigger including Q11 through Q17 are identical and therefore have identical base-emitter voltage drops. This is particularly the case, since in the preferred embodiment they are in integrated form. Substituting equation (5) in equation (4) gives:

$$V_1=(V_{cc}-V_{BE})\times R_3/R_2+R_3 \qquad (6)$$

In order turn transistor Q13 off, the voltage across capacitor C must drop to a value such that the input voltage of transistor Q13 will be less than $V_1$. Specifically, the voltage must drop below:

$$V_{off}=3V_{BE}+V_1 \qquad (7)$$

where $3V_{BE}$ is of course made up of the base-emitter voltage drops of transistors Q11, Q12 and Q13. The above equation ignores a small voltage drop across $R_1$.

When the voltage across the capacitor C reaches $V_{max}$ turning Q13 on, Q14 is turned off turning Q17 off, turning Q10 off, and finally allowing Q6 to turn on, thus causing the current of the magnitude 2I to flow from capacitor C, to discharge it. This discharge action occurs until capacitor C falls below the $V_{off}$ value, which is $V_{min}$ to turn transistor Q13 off and Q14 on. When transistor Q14 turns on, current flows through $R_2$ into its base and through $R_4$ into the collector and thence through $R_3$ to ground. The voltage across $R_3$ in this condition is given by:

$$V_2=IR\times R_3 \qquad (8)$$

where $I_{14}$ is the emitter-collector current of Q14 and $V_2$ the potential at the junction of $R_3$ and the emitter of Q14 for this condition of the Schmitt trigger. Current $I_{14}$ is determined by:

$$I_{14}=\frac{V_{cc}-V_{BE}}{\frac{R_2\times R_4}{R_2+R_4}+R_3} \qquad (9)$$

where $V_{BE}$ is the base emitter drop of Q16 and the base emitter voltage drop of transistor Q14 is ignored. Substituting equation (9) in equation (8):

$$V_2=\frac{(V_{cc}-V_{BE})R_3}{\frac{R_2\times R_4}{R_2+R_4}+R_3} \qquad (10)$$

The conduction of Q14 causes Q17 to conduct and also Q10 to conduct to thus turn Q6 off to prevent any current from being produced by source $I_4$. Thus only the charging current I from the current source $I_3$ is provided the capacitor and the voltage across the capacitor is allowed to charge at a rate determined by the applied control voltage $V_c$ back towards the $V_{max}$ voltage. When the $V_{max}$ voltage is reached, transistor Q13 will turn on again and Q14 concomittantly will turn off. To accomplish this the voltage across capacitor C must increase above:

$$V_{on}=3V_{BE}+V_2 \qquad (11)$$

Thus, the switching voltage of the Schmitt trigger, or the hysteresis of it, is a difference $\Delta V$ between the two voltages which is:

$$\Delta V=V_{on}-V_{off} \qquad (12)$$

Substituting the appropriate equations, (7) and (11), yields the value:

$$\Delta V=(V_{cc}-V_{BE})R_3\frac{1}{\frac{R_2\times R_4}{R_2+R_4}+R_3}-\frac{1}{R_2+R_4} \qquad (13)$$

The above equation illustrates that if the supply voltage $V_{cc}$ is much larger than $V_{BE}$ and constant, then $\Delta V$ (and therefore the output frequency of triangular wave shape 13) is determined only by the resistance ratios. Such ratios can be made accurate and with an almost zero temperature coefficient in view of the integration of all components of the device.

Such an integrated format is shown in FIG. 4 where the integrated device bears the same legends as illustrated in FIG. 3. Note that the only two external components are the capacitor C and the resistor R at the emitter of Q1. This is for the purpose of allowing different scale factors and the use of a variable resistor. In addition transistors Q1 and Q3 through Q8 are diffused so as to have substantially identical characteristics and the same is true of the Schmitt trigger transistors Q13 through Q17. The resistors $R_1$ through $R_4$ of the trigger circuit are of the diffused type as illustrated in FIG. 5.

Figure 5:
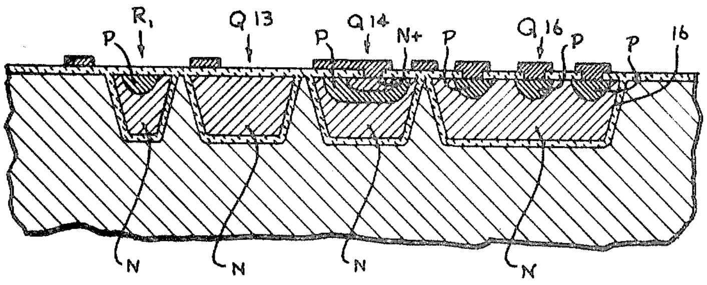
FIG. 5 is a cross-sectional view of FIG. 4 taken along line 4—4.

FIG. 5 is a cross section of FIG. 4 showing dielectric isolation by the U-shaped silicon dioxide troughs 16. This isolation is shown in dashed outline in FIG. 4. Specifically the following integrated components are grouped together on common islands: Q1, Q3–Q5; Q7, Q8; Q11, Q12, Q15, $R_{load}$, $R_1$–$R_6$, Q16, Q17. Q6, Q9, Q10, Q13, and Q14 are individually isolated. Two types of diffused planar transistors are used. One is illustrated by Q14 (FIG. 5) and is a typical 3 layer transistor produced by a two step diffusion process. Similar transistors are Q1, Q6–Q15.

The other type of transistor is a lateral type as illustrated by Q16 where the collector c as indicated (FIG. 4) partially surround the emitter *e*. Q3, Q4, Q5, Q16 and Q17 constitute this type.

As discussed above transistors Q7 and Q8 are combined into a double-sized unit as is apparent from its dielectric isolation island 16. Q12 is actually a dual transistor.

In the integrated circuit of FIG. 5 conductor bridges are provided for coupling purposes and include a bridge 17 connecting Q15 to $V_{cc}$ and a bridge 18 connecting the capacitor C pad to Q5 and Q11. A different portion 19 of Q3 provides a common coupling for Q1, Q3–Q5.

All of the resistors of the integrated circuit are of the diffused type as exemplified by $R_1$ (FIG. 5).

Thus the present invention has provided improved voltage controlled multivibrator or voltage to frequency converter which provides a triangular wave shape having low harmonics and having an almost zero temperature coefficient.

We claim:

1. In an integrated circuit for a voltage to frequency converter for converting an analog input signal into a periodic signal having a frequency related to the magnitude of said input signal, a semiconductive substrate, electrical charge integrating means, switching means coupled to said integrating means for sensing predetermined maximum and minimum magnitudes of integrated charge, said switching means including a plurality of transistors integrated in said substrate, said switching means switching from one condition to another in response to said maximum and minimum magnitudes, electrical charge source means coupled to said integrating means including four current sources, one of said sources being responsive to the magnitude of said input signal to produce a first current proportional to said magnitude, said first source being coupled to a second current source having a second current equal to said first current, said second source being coupled to both third and fourth current sources which are coupled to said integrating means said third source producing in response to said second current a third current equal to both said first and second currents in a sense to cause the magnitude of the integrating current to increase and said fourth source producing in response to said second current a fourth current twice the magnitude of said first and second currents in an opposite sense to cause the magnitude of integrated current to decrease, said fourth current source producing said fourth current only in response to a predetermined condition of said switching means said charge source means including a plurality of transistors integrated in said substrate and having substantially identical characteristics.

2. An integrated circuit as in claim 1 in which said switching means includes a Schmitt trigger circuit having high-impedance input means coupled to said integrating means.

3. An integrated circuit as in claim 2 in which said high-impedance input is provided by a Darlington pair of integrated transistors.

* * * * *